Jan. 24, 1933.   V. C. NORQUIST ET AL   1,895,083
FILTER
Filed June 6, 1930
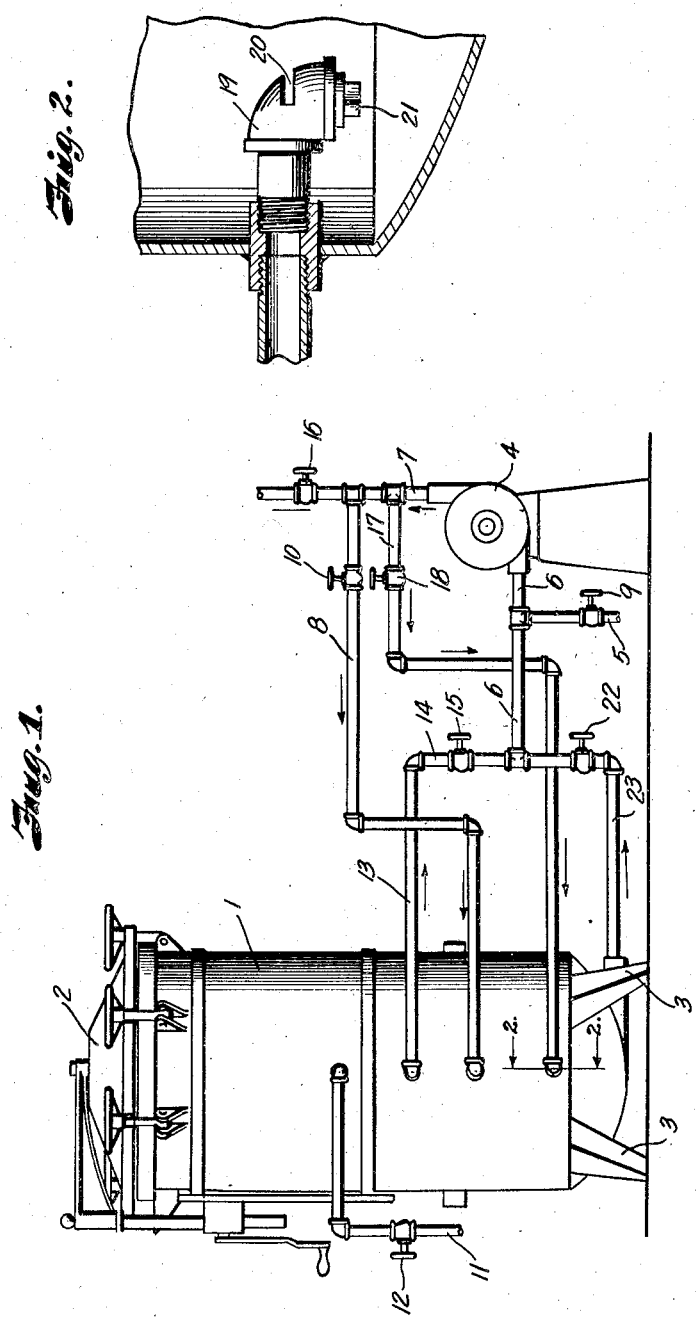
INVENTOR.
Victor C. Norquist
and Earl E. Treanor
BY
ATTORNEY.

Patented Jan. 24, 1933

1,895,083

UNITED STATES PATENT OFFICE

VICTOR C. NORQUIST AND EARL E. TREANOR, OF KANSAS CITY, MISSOURI, ASSIGNORS TO BUTLER MANUFACTURING COMPANY, OF KANSAS CITY, MISSOURI, A CORPORATION OF MISSOURI

FILTER

Application filed June 6, 1930. Serial No. 459,578.

This invention relates to improvements in filters and refers more particularly to a clean-out arrangement for dry-cleaning filters which permits the elimination of dirt and accumulation from the bottom of a filter by utilization of the solvent contained therein.

The application is an improvement over our previous application Serial No. 428,575, filed February 15, 1930.

In so far as the operation of the filter is concerned, the same operation is practised in connection with the present filter design. Briefly, the filter comprises a plurality of plates or leaves made up of fine mesh screen held in rectangular frames of different widths, the wider frames being near the center of the filter casing, and the narrow widths at the ends. These leaves are supported at the bottom by means of a manifold so that the liquid within the casing is drawn into the screens and thence into the manifold due to suction imposed upon the end of the manifold extending beyond the casing and connected to a pump. The liquid to be filtered is introduced to the casing by means of stand pipes positioned within the casing so that the introduction pipe, although entering the casing near the bottom, discharges the liquid near the top of the casing. The interior construction of the filter, together with the discharge pipe through which the filtered material is withdrawn from the filter after passing through the filter leaves, have been eliminated from the drawing to simplify the showing, and only the flushing system with the pump and connections have been shown. In place of flushing out the filter with water, which practice is objectionable to some dry-cleaning establishments, it is contemplated to recirculate the cleaning solvent from the filter as a flushing agent to eliminate the dirt collected in the bottom compartment.

Fig. 1 is a side elevational view of the clean-out arrangement.

Fig. 2 is an enlarged detail of the flushing nozzle.

Referring to the drawing, at 1 is shown the filter casing having a removable top 2. The casing is set upon standards or legs 3. The solvent containing the filter aid supplied from the washer or cleaning equipment passes into the pump 4 through the suction connections 5 and 6. From the pump the material is discharged through the pipes 7 and 8 into vertical stand pipes within the casing which empty the solvent into the upper or top part of the filter.

After the operation has continued to the extent that the accumulation of dirt and sediment has become objectionable in the bottom compartment, the filter is cut out of the system by closing the valve 9 in the line 5 and the valve 10 in the line 8.

About midway of the height of the filter casing is a drain pipe 11 controlled by a valve 12 to which level the solvent is drained when the filter has been cut out of the system for cleaning. After draining the solvent down to the level of the pipe 11 the solvent is withdrawn from the filter through pipes 13 and 14, which remove the solvent from the casing 1 surrounding the filter plates the latter pipe 14 having connection through a T with the suction line 6 of the pump 4. A valve 15 in the line 14 controls the flow therethrough. The solvent withdrawn in this manner is discharged through the pipe 7 and when the valves 10 and 16 are closed the material is directed through the pipe 17 regulated by a valve 18 to be injected through the nozzle 19 positioned in the bottom of the pump and shown in Fig. 2 of the drawing. This nozzle is an elbow in which has been sawed a slit 20 and which is plugged as shown at 21 so that the fan-shaped spray agitates the accumulated material in the bottom of the filter. This type of nozzle may be replaced by any suitable design of nozzle which will create a turbulence and agitation of the materials accumulated in the bottom compartment of the filter. When the recirculation has been continued for a sufficient period of time to agitate the solvent particles into a liquid suspension, the valves 15 and 18 are closed and the valve 22 in the drawoff pipe 23 opened. At the same time the valve 16 in the discharge pipe 7 is opened so that the materials withdrawn from the bottom of the filter pass through the pipe 23 through the suction pipe 6 into the pump 4 and are discharged therefrom through the pipe 7 to the sludge tank or any other suitable receptacle for the disposal of the contaminated flushing medium or solvent.

By this method the solvent contained in the filter is used as a flushing medium. Also the quantity of flushing medium is considerably reduced.

Many establishments object to the introduction of water into a filter, and this method of recirculating the solvent eliminates the necessity of the use of water to flush out the accumulated solvents.

A further attribute of the recirculation of the solvent as the flushing medium is the fact that it can be done quickly with practically no additional expense for equipment.

The pump 4 is used in connection with the filter for three purposes—first, to supply the solvent from the cleaning equipment to the filter; second, to recirculate the solvent; for agitating the solids in the filter; and finally, to pump out the suspension of solid particles after the agitation by recirculation.

After the solvents have been flushed from the system the valves 22 and 16 are closed as are the valves 15 and 18. Valves 9 and 10 are opened and the valve 12 in the drain pipe 11 closed. The filter is then in condition for use in the system.

We claim as our invention:

A flushing assembly for filters used in purifying dry-cleaners solvent, comprising a pump, a connection to the suction of the pump for removing solvent from the filter, a connection to the pump discharge for reintroducing the solvent near the bottom of the filter, and a second connection to the pump discharge for diverting the suspensoid from the filter, and a connection to the filter below the pipe for reintroducing the solvent thereto, said connection leading to the suction of the pump.

In testimony whereof we affix our signatures.

VICTOR C. NORQUIST.
EARL E. TREANOR.